US012610177B2

(12) United States Patent
Linghu et al.

(10) Patent No.: US 12,610,177 B2
(45) Date of Patent: Apr. 21, 2026

(54) EARPHONE CORE

(71) Applicant: AAC Microtech (Changzhou) Co., Ltd., Changzhou City (CN)

(72) Inventors: Ronglin Linghu, Shenzhen (CN); Long Zhang, Shenzhen (CN); Xianjie Dong, Shenzhen (CN)

(73) Assignee: AAG Microtech (Changzhou) Co., Ld., Changzhou City (CN)

( * ) Notice: Subject to any disclaimer, the term of this patent is extended or adjusted under 35 U.S.C. 154(b) by 0 days.

(21) Appl. No.: 17/913,825

(22) PCT Filed: Jul. 26, 2022

(86) PCT No.: PCT/CN2022/107736
§ 371 (c)(1),
(2) Date: Sep. 22, 2022

(87) PCT Pub. No.: WO2024/000707
PCT Pub. Date: Jan. 4, 2024

(65) Prior Publication Data

US 2025/0150750 A1 May 8, 2025

(30) Foreign Application Priority Data

Jun. 29, 2022 (CN) ......................... 202221658267.6

(51) Int. Cl.
*H04R 1/24* (2006.01)
*H04R 1/06* (2006.01)
*H04R 1/10* (2026.01)
*H04R 9/02* (2006.01)
*H04R 9/06* (2006.01)

(52) U.S. Cl.
CPC ................. *H04R 1/24* (2013.01); *H04R 1/06* (2013.01); *H04R 1/1075* (2013.01); *H04R 9/025* (2013.01); *H04R 9/06* (2013.01); *H04R 2201/003* (2013.01); *H04R 2400/11* (2013.01)

(58) Field of Classification Search
CPC ... H04R 1/24; H04R 1/06; H04R 9/06; H04R 9/025; H04R 2201/003; H04R 2400/11
See application file for complete search history.

(56) References Cited

FOREIGN PATENT DOCUMENTS

CN 114598973 A * 6/2022 .............. H04R 9/02

* cited by examiner

*Primary Examiner* — Sunita Joshi
(74) *Attorney, Agent, or Firm* — Wlersch Law Group

(57) ABSTRACT

The present disclosure discloses an earphone core having a frame with a receiving space and a magnet unit and a vibration unit both fixed on the frame. The magnet unit includes a yoke and the first magnet. The vibration unit includes a diaphragm and a coil fixed on the diaphragm; a MEMS tweeter for providing high frequency sound is mounted on the first magnet the MEMS tweeter, the coil and the diaphragm are coaxially arranged along a vibration direction of the diaphragm. An axial height of the earphone core is effectively reduced, thereby saving its occupied space when applied in TWS earphone products.

9 Claims, 5 Drawing Sheets

100

EARPHONE CORE

FIELD OF THE PRESENT DISCLOSURE

The present disclosure relates to electro-acoustic transducer, especially relates to an earphone core applied in earphone.

DESCRIPTION OF RELATED ART

With the wild application of lossless sound quality in variable portable electronics, users have higher and higher quality requirements for supplementary earphones. Not only small package size is required, high fidelity sound performance to reproduce lossless sound quality is also expected at the same time.

In related art, the earphone generally includes a shell and an earphone core received in the shell. The earphone core only provides one magnet unit to provide low frequency sound and immediate frequency sound. When high frequency sound is required, two magnet units are configured to be coaxially stacked to meet the demand, thus increasing the axial height of the earphone core and accordingly impacting the miniaturization trend.

Therefore, it is necessary to provide an improved earphone core to overcome the problems mentioned above.

SUMMARY OF THE INVENTION

The present disclosure provides an earphone core with smaller axial height providing whole frequency range sound.

The earphone core includes a frame with a receiving space; a magnet unit having a magnetic gap and received in the receiving space, including: a yoke fixed on the frame; and a first magnet fixed on the yoke; a vibration unit fixed on the frame, including: a diaphragm fixed to the frame; and a coil fixed on a side of the diaphragm facing the magnet unit and inserted in the magnetic gap; a MEMS tweeter fixed on the first magnet; the MEMS tweeter, the coil and the diaphragm are coaxially arranged along a vibration direction of the diaphragm.

Further, the diaphragm includes a first through hole penetrating thereon along the vibration direction, an inner edge enclosing the first through hole, and an outer edge fixed on the frame; the inner edge is fixed on the first magnet; the MEMS tweeter is fixed on the first magnet through the first through hole.

Further, the magnet unit includes a magnetic plate fixed on a side of the first magnet facing the diaphragm and a second magnet fixed on a side of the magnetic plate away from the first magnet; the inner edge of the diaphragm is fixed on the second magnet; the MEMS tweeter is fixed on the second magnet through the first through hole.

Further, the yoke includes a second through hole penetrating thereon along the vibration direction; the first magnet is fixed on the yoke and covers the second through hole; the MEMS tweeter is fixed on the first magnet through the second through hole.

Further, the yoke includes a bottom wall for mounting the first magnet and a side wall bending from an edge of the bottom wall and extending towards the diaphragm; the side wall is spaced apart from the first magnet to form the magnetic gap; the second through hole is provided on the bottom wall.

Further, the frame includes a first fixation portion surrounding the side wall, a second fixation portion bending from an edge of the first fixation portion and extending away from the coil, and a third fixation portion bending from an edge of the second fixation portion and extending towards the diaphragm; the diaphragm is fixed on the third fixation portion.

Further, the side wall includes a third through hole penetrating thereon along a direction perpendicular with the vibration direction; the first fixation portion includes a protrusion portion inserted in the third through hole and fixed on the side wall.

Further, the vibration unit includes a coil frame fixed on the diaphragm and configured to suspend the coil in the magnetic gap; the coil frame includes a first support portion fixed on the diaphragm, a second support portion extending from the first support portion towards the magnetic gap, and a third support portion bending from an end of the second support portion away from the diaphragm and extending towards the first magnet; the coil is carried on a side of the third support portion facing the diaphragm and abutted to a surface of the second support portion facing the first magnet.

Further, the vibration unit includes a FPC fixed on the diaphragm; the FPC includes a first connection portion fixed on the diaphragm, a second connection portion fixed on the third fixation portion, and an elastic portion connecting the first connection portion with the second connection portion; the first connection portion is fixed on a surface of the first support portion away from the diaphragm.

Further, the second support portion includes a fourth through hole penetrating thereon along a direction perpendicular with the vibration direction; the coil includes a wire electrically connected with the FPC through the fourth through hole.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENTS

Figure 1:
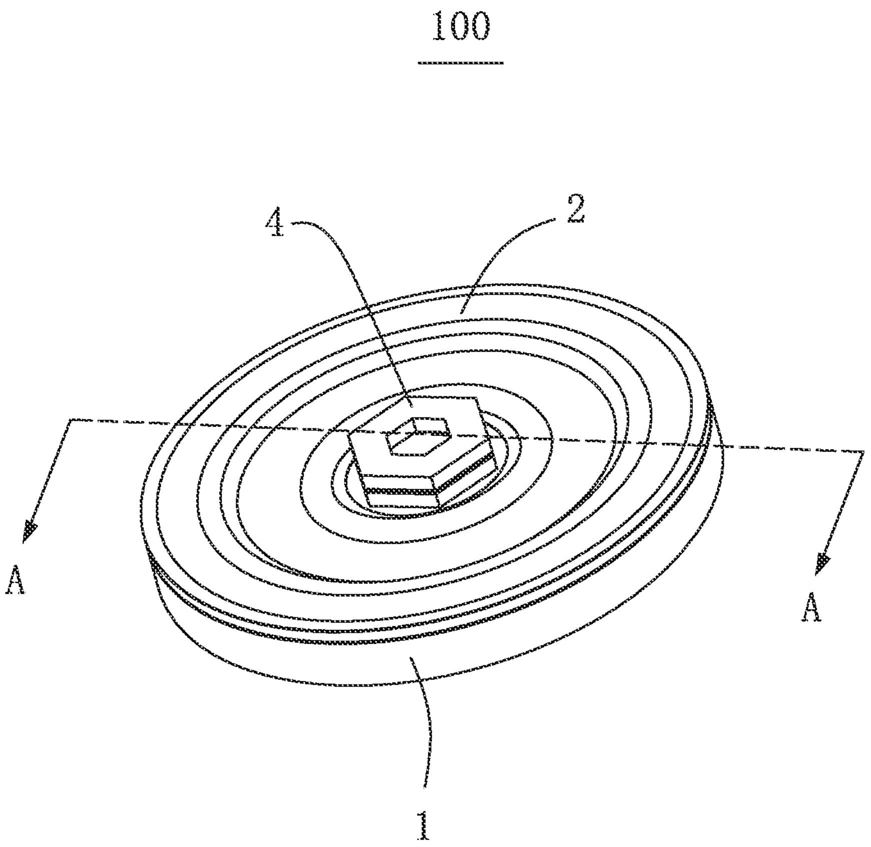
FIG. 1 is an isometric view of an earphone core in accordance with an exemplary embodiment of the present disclosure.
Figure 2:
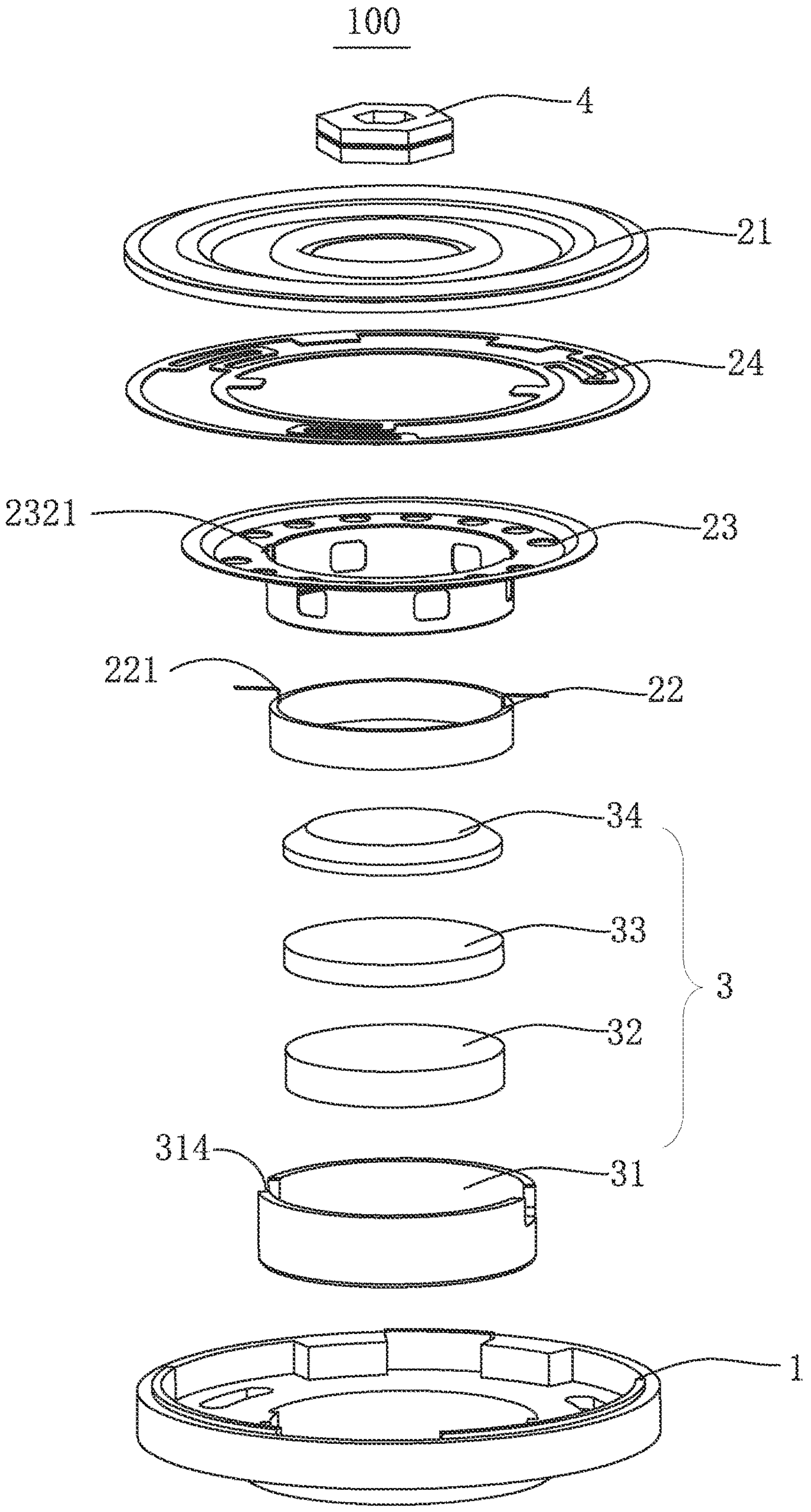
FIG. 2 is an exploded view of the earphone core in FIG. 1.
Figure 3:
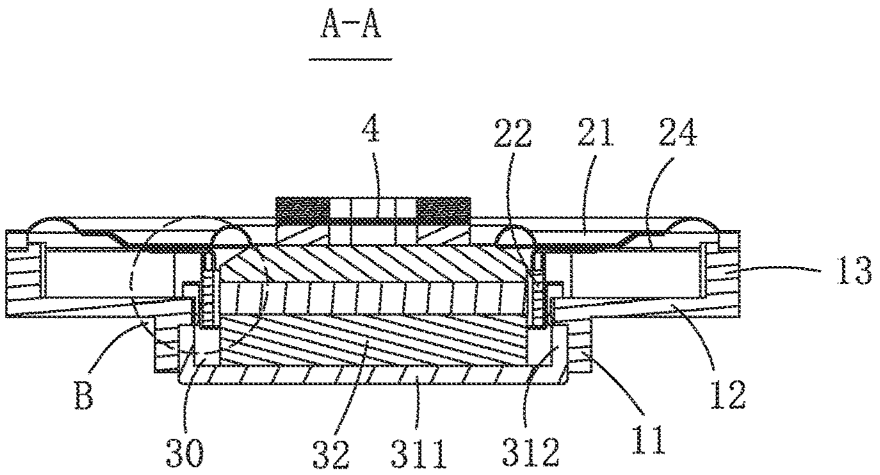
FIG. 3 is a cross-sectional view of the earphone core taken along line A-A in FIG. 1.

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Please refer to FIGS. 1-6 together, an earphone core 100 provided by an exemplary embodiment of the present disclosure includes a frame 1 with a receiving space 10, a vibration unit 2 fixed on the frame 1, a magnet unit 3 having a magnetic gap 30 and received in the receiving space 10, and a MEMS tweeter 4 for providing high frequency sound.

The vibration unit 2 includes a diaphragm 21 fixed to the frame 1, a coil 22 fixed on a side of the diaphragm 21 facing the magnet unit 3, a coil frame 23 fixed on the diaphragm 21 and configured to suspend the coil 22 in the magnetic gap 30, and a FPC 24 fixed on the diaphragm 21. The FPC 24 electrically connects the coil 22 with circuit outside the earphone core 100 in such a manner the diaphragm 21 is driven by the coil 22 to vibrate along a vibration direction.

The magnet unit 3 includes a yoke 31 fixed on the frame 1, a first magnet 32 fixed on the yoke 31, a magnetic plate 33 fixed on a side of the first magnet 32 facing the diaphragm 21, and a second magnet 34 fixed on a side of the magnetic plate 33 away from the first magnet 32. Specifically, the yoke 31 includes a bottom wall 311 for mounting the first magnet 32 and a side wall 312 bending from an edge of the bottom wall 311 and extending towards the diaphragm 21; the side wall 312 is spaced apart from the first magnet 32 to form the magnetic gap 30.

The frame 1 includes a first fixation portion 11 surrounding the side wall 312, a second fixation portion 12 bending from an edge of the first fixation portion 11 and extending away from the coil 22, and a third fixation portion 13 bending from an edge of the second fixation portion 12 and extending towards the diaphragm 21; the diaphragm 21 is fixed on the third fixation portion 13.

Besides, in order to improve the bond strength between the frame 1 and the yoke, the side wall 312 of the yoke 31 includes a third through hole 314 penetrating thereon along a direction perpendicular with the vibration direction; the first fixation portion 11 of the frame 1 includes a protrusion portion 111 inserted in the third through hole 314 to be fixed on the side wall 312. In this manner, the bond strength between the first fixation portion 11 and the side wall 312 is effectively improved with increasing their fixation area.

Moreover, the coil frame 23 includes a first support portion 231 fixed on a side of the diaphragm 21 facing the coil 22, a second support portion 232 extending from the first support portion 231 towards the magnetic gap 30, and a third support portion 233 bending from an end of the second support portion 232 away from the diaphragm 21 and extending towards the first magnet 32; the coil 22 is carried on a side of the third support portion 233 facing the diaphragm 21 and abutted to a surface of the second support portion 232 facing the first magnet 32. A "L" shape structure formed by the second support portion 232 and the third support portion 233 and surrounding the coil 22 can be served as a dome of the vibration unit 2, thus improving acoustic performance of a sound unit composed of the vibration unit 2 and the magnet unit 3 for providing low frequency sound and immediate frequency sound.

Figure 4:
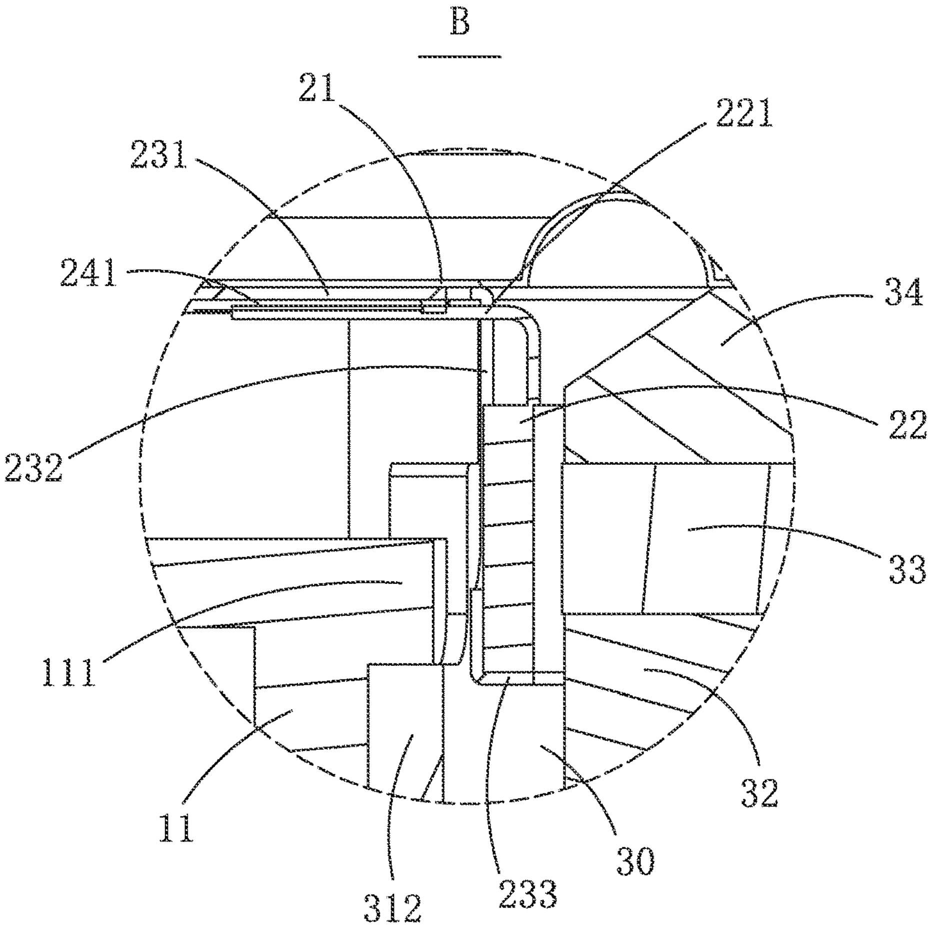
FIG. 4 is an enlarged view of part B in FIG. 3.
Figure 5:
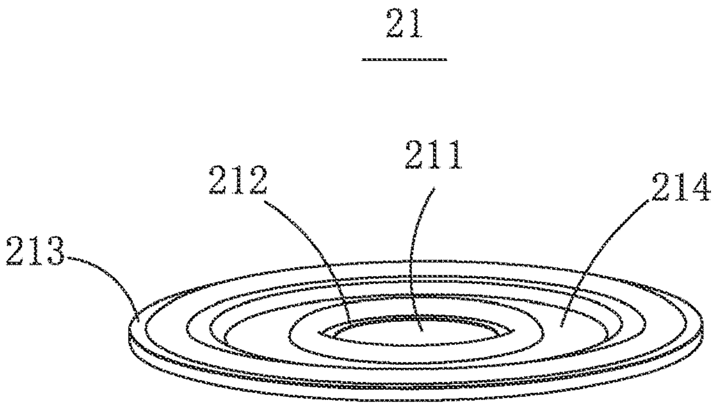
FIG. 5 is an isometric view of a diaphragm of the earphone core in FIG. 1.
Figure 6:
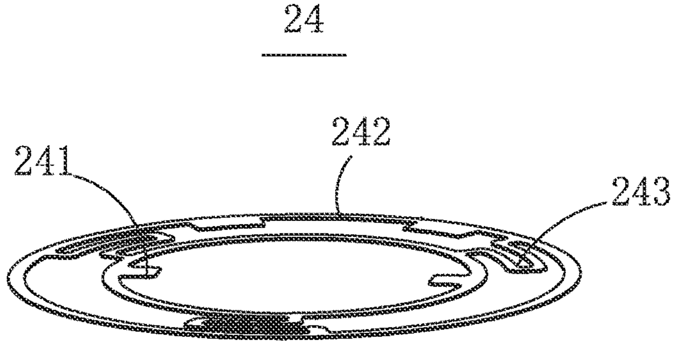
FIG. 6 is an isometric view of a FPC of the earphone core in FIG. 1.

As shown in FIGS. 4-6, the FPC 24 includes a first connection portion 241 fixed on the diaphragm 21, a second connection portion 242 fixed on the third fixation portion 13, and an elastic portion 243 connecting the first connection portion 241 with the second connection portion 242; the first connection portion 241 is fixed on a surface of the first support portion 231 away from the diaphragm 21. It can be understood that the FPC 24 includes at least two elastic portion 243 arranged at intervals.

Additionally, the second support portion 232 includes a fourth through hole 2321 penetrating thereon along a direction perpendicular with the vibration direction; the coil 22 includes a wire 221 electrically connected with the FPC 24 through the fourth through hole 2321.

As shown in FIG. 5, the diaphragm 21 includes a first through hole 211 penetrating thereon along the vibration direction, an inner edge 212 enclosing the first through hole 211, an outer edge 213 fixed on the third fixation portion 13 of the frame 1, and a central portion 214 located between the inner edge 212 and the outer edge 213; the inner edge 212 is fixed on the second magnet 34; the MEMS tweeter 4 is fixed on the second magnet 34 through the first through hole 211.

Specifically, the MEMS tweeter 4 for providing high frequency sound is mounted on the second magnet 34 along the vibration direction. It can be understood that the sound unit composed of the vibration unit 2 and the magnet unit 3 is configured to provide low frequency sound and immediate frequency sound. The MEMS tweeter 4 is configured to provide high frequency sound. Thus, the earphone core 100 in the present disclosure can provide sound of whole frequency range. Furthermore, the MEMS tweeter 4, the coil 22 and the diaphragm 21 are coaxially arranged along the vibration direction. In this manner, an axial height of the earphone core is effectively reduced, thereby saving its occupied space when applied in TWS earphone products.

Figure 7:
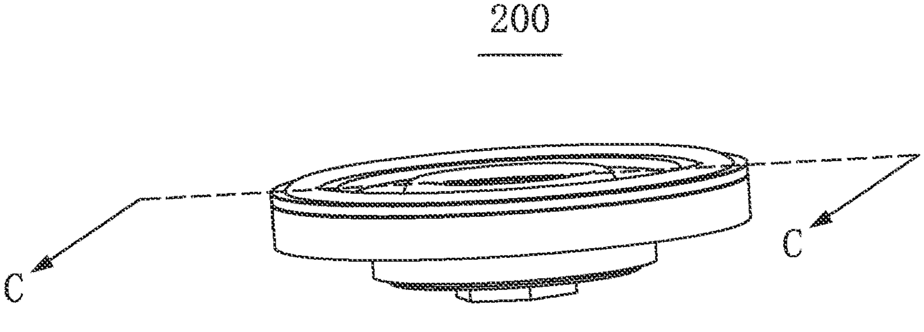
FIG. 7 is an isometric view of an earphone core in accordance with another exemplary embodiment of the present disclosure.
Figure 8:
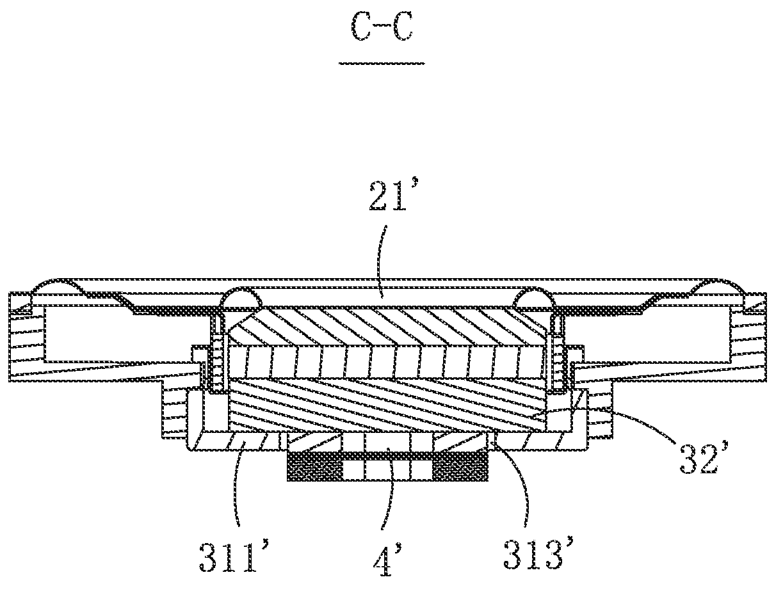
FIG. 8 is a cross-sectional view of the earphone core taken along line C-C in FIG. 7.
Figure 9:
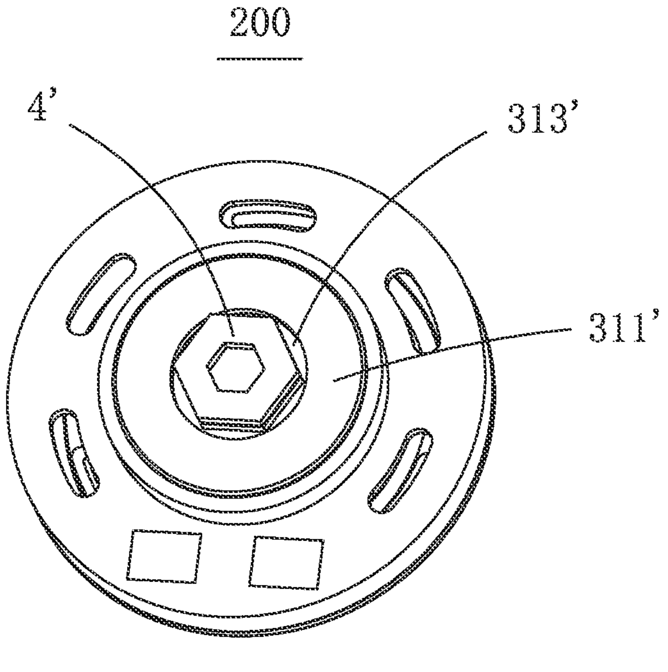
FIG. 9 is a bottom view of the earphone core in FIG. 7.

As shown in FIGS. 7-9, an earphone 200 is provided by another exemplary embodiment of the present disclosure. Compared with the earphone 100, the only difference is that the MEMS tweeter 4' is fixed on the first magnet 32'. Specifically, the bottom wall 311' of the yoke 31' includes a second through hole 313' penetrating thereon along the vibration direction; the first magnet 32' is fixed on the yoke 31' and covers the second through hole 313'; the MEMS tweeter 4' is fixed on the first magnet 32' through the second through hole 313'. Specifically, in this embodiment, the MEMS tweeter 4' is fixed on a surface of the first magnet 32' away from the diaphragm 21'. It can be understood that the MEMS tweeter 4' and the diaphragm 21' are still coaxially arranged along the vibration direction.

Compared with the related art, in the earphone core of the present disclosure, the sound unit composed of the vibration unit and magnet unit are configured to provide low frequency sound and immediate frequency sound; a MEMS tweeter for providing high frequency sound is mounted on the first magnet or the second magnet of the magnet unit; and the MEMS tweeter, the coil and the diaphragm are coaxially arranged, thus effectively reducing an axial height of the earphone core.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An earphone core comprising:

a frame with a receiving space;

a magnet unit having a magnetic gap and received in the receiving space, comprising:
a yoke fixed on the frame; and
a first magnet fixed on the yoke;
a vibration unit fixed on the frame, comprising:
a diaphragm fixed to the frame; and
a coil fixed on a side of the diaphragm facing the magnet unit and inserted in the magnetic gap, a MEMS tweeter fixed on the first magnet;
wherein the MEMS tweeter, the coil and the diaphragm are coaxially arranged along a vibration direction of the diaphragm;
the diaphragm comprises a first through hole penetrating thereon along the vibration direction, an inner edge enclosing the first through hole, and an outer edge fixed on the frame; the inner edge is fixed on the first magnet; the MEMS tweeter is fixed on the first magnet through the first through hole.

2. The earphone core as described in claim 1, wherein the magnet unit further comprises a magnetic plate fixed on a side of the first magnet facing the diaphragm and a second magnet fixed on a side of the magnetic plate away from the first magnet; the inner edge of the diaphragm is fixed on the second magnet; the MEMS tweeter is fixed on the second magnet through the first through hole.

3. The earphone core as described in claim 1, wherein the yoke comprises a second through hole penetrating thereon along the vibration direction; the first magnet is fixed on the yoke and covers the second through hole; the MEMS tweeter is fixed on the first magnet through the second through hole.

4. The earphone core as described in claim 3, wherein the yoke further comprises a bottom wall for mounting the first magnet and a side wall bending from an edge of the bottom wall and extending towards the diaphragm; the side wall is spaced apart from the first magnet to form the magnetic gap; the second through hole is provided on the bottom wall.

5. The earphone core as described in claim 4, wherein the frame comprises a first fixation portion surrounding the side wall, a second fixation portion bending from an edge of the first fixation portion and extending away from the coil, and a third fixation portion bending from an edge of the second fixation portion and extending towards the diaphragm; the diaphragm is fixed on the third fixation portion.

6. The earphone core as described in claim 5, wherein the side wall comprises a third through hole penetrating thereon along a direction perpendicular with the vibration direction; the first fixation portion comprises a protrusion portion inserted in the third through hole and fixed on the side wall.

7. The earphone core as described in claim 5, wherein the vibration unit further comprises a coil frame fixed on the diaphragm and configured to suspend the coil in the magnetic gap; the coil frame comprises a first support portion fixed on the diaphragm, a second support portion extending from the first support portion towards the magnetic gap, and a third support portion bending from an end of the second support portion away from the diaphragm and extending towards the first magnet; the coil is carried on a side of the third support portion facing the diaphragm and abutted to a surface of the second support portion facing the first magnet.

8. The earphone core as described in claim 7, wherein the vibration unit further comprises a FPC fixed on the diaphragm; the FPC comprises a first connection portion fixed on the diaphragm, a second connection portion fixed on the third fixation portion, and an elastic portion connecting the first connection portion with the second connection portion; the first connection portion is fixed on a surface of the first support portion away from the diaphragm.

9. The earphone core as described in claim 8, wherein the second support portion comprises a fourth through hole penetrating thereon along a direction perpendicular with the vibration direction; the coil comprises a wire electrically connected with the FPC through the fourth through hole.

* * * * *